United States Patent Office 3,434,997
Patented Mar. 25, 1969

3,434,997
NOVOLAK RESINS MIXED WITH
POLYVINYL ALCOHOL
Kurt Schmoll, Hangelar-Niederberg, Germany, assignor to Dynamit Nobel Aktiengesellschaft, a corporation of Germany
No Drawing. Filed Mar. 30, 1967, Ser. No. 627,600
Claims priority, application Germany, Apr. 1, 1966, D 49,756
Int. Cl. C08g 37/16, 41/04, 51/34
U.S. Cl. 260—33.4                                    9 Claims

ABSTRACT OF THE DISCLOSURE

A process for manufacturing molding compositions on the basis of novolaks and hexamethylene tetramine and containing a filler wherein the hardening time is considerably and significantly shortened by incorporating into the novolak prior to the removal of the water therefrom, or into the molding compound itself, polyvinyl alcohol in an amount of from 0.05 to 2.5 weight percent referred to the novolak. The invention also covers the novel molding compositions thus produced.

This invention is directed to a process for rapidly hardening molding compositions on the basis of novolaks and hexamethylene tetramine and including a filler and most particularly this invention relates to a process for decreasing the time for hardening molding compositions on the basis of novolaks and hexamethylene tetramine and containing a filler and to the new compositions of matter thus produced protected against the formation of cracks, bubbles and voids.

With the development of automatic presses it has become possible to produce molded articles at a high rate of speed. In order to take advantage of this possibility of high speed production, it is necessary to use molding compounds having a very rapid setting action. However, the molding compounds which have been available until now do not adequately meet these requirements. Phenol formaldehyde molding compounds are characteristically compounds which first soften under the influence of heat and pressure applied during the molding process, and in this plastic state they assume the shape of the mold. Thereafter, they harden into a solid object and can be stripped from the mold while still hot. The hardening or setting action is due to the further condensation of the thermosetting resin, which takes place under the conditions of the molding operation. Water and, to a slight extent, formaldehyde and ammonia are evolved during this thermosetting action. The liberation of the gaseous by-products, however, in addition to the natural moisture in the molding compound, considerably interferes with the process of the manufacture of such thermosetting plastics. The presence of water of course retards crosslinking in the resin and accordingly necessitates extended baking of the molding compound until it is thoroughly hardened. Furthermore, the water consumes a considerable portion of the thermal energy.

In principle, it is possible to accelerate the setting action by raising the pressing temperature, but such acceleration is limited by the fact that at very high temperatures the surface areas of the object set so rapidly in the pressing process that the water vapors and gases which are still being liberated in the interior can no longer escape. The products which are then obtained consequently contain cracks, bubbles and voids.

In order to shorten the setting time it has been heretofore necessary to attempt to remove from the molding compound, before it is molded, at least some of the water that interferes with the setting process. The following measures have been used in this regard:

(1) The compound is tabletted and before pressing is subjected to preheating outside of the mold, as for example, by high-frequency heating. The setting time is reduced by about 50% in this manner, but this method requires two additional operations prior to pressing, with the resultant additional cost.

(2) In the pressing of non-preheated molding compounds, it has proven desirable, after closing the die filled with the compound, to open it briefly at what amounts to the opportune moment. This so called venting permits the water vapor that has formed to escape, and in this manner thermal energy is saved, resulting in a faster setting time. The time saved in the hardening by the venting amounts to as much as 10%.

It is, therefore, an object of the present invention to shorten the hardening time of molding compositions prepared on the basis of novolaks and hexamethylene tetramines.

It is another object of the invention to shorten the hardening time of molding compositions prepared on the basis of novolaks and hexamethylene tetramine while protecting them against the formation of cracks, bubbles and voids caused by the incomplete liberation of the vapors formed in the hardening.

It is still another object of the invention to shorten the hardening time of molding compositions prepared on the basis of novolaks and hexamethylene tetramine in an economically simple and feasible manner.

These and other objects will become apparent in the following description and claims.

More specifically, the present invention is directed to the manufacture of molding compositions containing filler and prepared on the basis of novolaks and hexamethylene tetramine, which comprises incorporating polyvinyl alcohol, advantageously, in the form of an aqueous solution thereof, into the novolaks before the removal of the water by distillation, or into the molding compositions in quantities of 0.05 to 2.5% and preferably 0.1 to 1% of the weight of the novolak resin. The aqueous polyvinyl alcohol solution may advantageously contain 0.3 to 3% by weight, and preferably 0.07 to 1.5% by weight, of other polyvalent alcohols such as glycol, diglycol or glycerin. Furthermore, 0.4 to 1.6% of calcium oxide and 0.4 to 1.6% of magnesium oxide, by weight, can advantageously be added to the molding compositions. The compositions can contain, in addition such fillers as wood flour, and also such commonly used additives as lubricants, pigments or the like.

The molding compositions manufactured according to the invention surprisingly offer remarkable technical advantages over those known hitherto. At the customary pressing temperatures and pressures, they can be hardened in significantly shorter time. The reduction of the setting time amounts to about 30 to 60%. Furthermore, the molding compositions manufactured according to the invention are perceptibly less sensitive to high working temperatures. This favors the molding of the compounds at high temperatures, which is desirable for economic reasons. Of additional great importance is the fact that the reduction of the setting time which is achieved renders the preheating and the venting of such molding compositions unnecessary.

As known there are used for manufacturing phenol resin molding compositions as resin components either novolaks or resols. As described in detail on pages 114–126 in the book Chemie der Phenolharze of K. Hultzsch, 1950, Springer-Verlag, both resins differ from another by the method of their production as well as by their properties.

Novolaks are prepared by the condensation of phenol with formaldehyde in a molar ratio of 1 to 1 up to 1 to less than 1 under use of acid condensation agents. Novolaks are meltable and soluble in certain solvents.

Resols, however, are produced by condensation of phenols with greater quantities of formaldehyde. The molar ratio in this case is 1 to greater than 1. Alkaline substances are used as condensation agents.

While resols are self-hardening compounds to novolaks must be added hexamethylene tetramine as a hardening agent. As usual, to 100 parts by weight of novolak 12 to 19 parts by weight, preferably 15–18 parts by weight, of hexamethylene tetramine are added.

For the process and the molding compositions according to the invention known lubricants as stearic acids and metal soaps as calcium-, zinc- and aluminium stearate or silicone oils in quantities of 0.5–1.5 weight percent, referred to the total compound, are used. As colorants for instance, inorganic earth colors as ferric oxide, chalk, plaster, ochre, umber, heavy spar and the like are used, but also organic colorants as for instance black and aniline dye can be used. Suitable quantities of the colorant are between 1 and 8 weight percent, preferably 4 to 6 weight percent, referred to the total compound.

Asbestos, textile fabric, cellulose, stone powder and the like can also be used as fillers for molding compositions instead of wood flour. Preferred quantities are about 40–60 weight percent, referred to the total compound.

The molded articles made from the molding compositions according to the invention do not only fulfill the properties of the DIN 7708 requests but have furthermore an extended dimensional stability against heating as well as less shrinkage during the hardening time and removing from the mold. Another advantage is the very good surface state and gloss.

The following representative examples will better illustrate the nature of the present invention however, the invention is not limited to these examples.

Example 1

(a) 20 g. of Polyviol M 05/140 (this is a trade name for a polyvinylalcohol of the Wacker-Chemie G.m.b.H., Munich) were dissolved in 50 g. of diglycol and 75 g. of water and were then added to the resulting solution.

(b) 2000 g. of phenol (90% by weight) were mixed with 1177 g. of 37% by weight solution of formaldehyde in water in a flask and heated to the boiling point. After stopping the heat 11.3 g. of hydrochloric acid (32% by weight) were added. The mixture then again was heated for 3½ hours. The condensation was stopped by adding water. The resin deposited soon so that the water could be decanted. Before the water was removed by distillation, the solution of polyvinyl alcohol, diglycol and water, as described under (a), was stirred into the condensation product in a quantity amounting to 3.25% of the weight of the resin. After a resin viscosity of 80 cp. had been established, the condensation product was poured into pots where it was allowed to cool. Thereafter the cooled resin was ground.

370 g. of the product thus obtained was mixed with 480 g. of wood flour, 60 g. of hexamethylene tetramine, 15 g. magnesium oxide, 15 g. of calcium oxide, 10 g. of zinc stearate and 50 g. of pigment. The molding compound thereby obtained was then worked in a mixing roller using rolls heated to 90 to 100° C. and subject to friction. There was thereby produced a rolled sheet which sheet was then ground to form a granular product.

For carrying out the tests, the molding compound was used in the un-preheated state to produce screw caps in a screw cap mold by the direct closing of the mold, i.e., without the intervention of preliminary press and airing cycles. The screw cap thus produced, having a wall thickness of 5 to 9 mm. was examined for surface quality and its internal structure was tested for bubbles and voids.

Satisfactorily hardened screw caps which were free of bubbles and voids and had high resistance to boiling water were obtained at a pressing temperature of 160° C. in 75 sec., 170° C. in 60 sec., and 180° C. in 45 sec. of setting time, independently of the flowing quality of the molding compound used.

When a molding compound made without the mixture described under (a) above was worked in the same manner, the minimum hardening time corresponding to the pressing temperatures amounted, in the most favorable case of a medium to hard flow adjustment, to 150 sec. (160° C.), 125 sec. (170° C.) and 100 sec. (180° C.), whereas in the pressing of compounds with a soft flow adjustment by the procedure described above, more or less porous areas developed within the screw cap due to excess moisture. These could be eliminated only by airing during the pressing process. The additive described under (a) thus results in a hardening time reduction of 50 to 55%.

Even at a temperature of 190° C., the molding compound according to the invention can be molded into perfect screw caps of the type described in 45 to 120 seconds, without preliminary pressing and airing.

Example 2

30 g. of wood flour was mixed with 14.5 g. of the solution described under (a) in Example 1, and the resulting mass was predried. Thereafter, 450 g. of wood flour, 370 g. of a novolak, produced in the manner of Example 1, 60 g. of hexamethylene tetramine, 15 g. of magnesium oxide, 15 g. of calcium oxide, 10 g. of zinc stearate and 50 g. of pigment were worked into the predried mass.

The mixture was worked by the rolling method as described in Example 1 and ground to form a granular product. The testing of the composition was conducted under the conditions described in Example 1 and produced the following results: perfect molded screw caps in the same scale of evaluation as in Example 1 were obtained at pressing temperatures of 160° C. in 90 seconds, at 170° C. in 75 seconds, and at 180° C. in 60 seconds of setting time. The reduction in setting time as compared with compositions which do not contain the additive of the invention thus amounts to about 40%.

Example 3

A premixture of 10 g. of Polyviol M 05/140, 15 g. of magnesium oxide, 15 g. of calcium oxide, 10 g. of zinc stearate and 50 g. of ochre were added to 440 g. of wood flour, 370 g. of a novolak produced in the manner of Example 1 and 60 g. of hexamethylene tetramine. The molding compound thereby obtained was then worked in a mixing roller in the manner described in Example 1.

The hardening of the produced molding composition was as favorable as that of the molding compositions described in Examples 1 and 2. This occurred a hardening time reduction of 40% in comparison of the molding compositons without the addition of polyvinylalcohol according to the invention.

A complete dispersion of the polyvinyl alcohol in the molding compound occurs, if a polyvinyl alcohol solution in water or in a mixture of water and a glycol is added to the molding compound. Therefore it is the preferable method of the invention to use those solutions of polyvinyl alcohols.

I claim:

1. A process for preparing a rapidly hardening molding composition on the basis of novolak and hexamethylene tetramine and containing filler which comprises incorporating polyvinyl alcohol into said composition in an amount of from 0.05 to 2.5 weight percent referred to said resin.

2. A process according to claim 1 wherein said polyvinyl alcohol is incorporated in an amount of from 0.1 to 1 weight percent referred to said resin.

3. A process according to claim 1 wherein said polyvinyl alcohol is used in the form of its aqueous solution.

4. A process according to claim 3 wherein said aqueous solution additionally contains 0.3 to 3 weight percent of at least one member selected from the group consisting of glycol, diglycol and glycerin.

5. A process according to claim 3 wherein said aqueous solution additionally contains 0.7 to 1.5 weight percent of at least one member selected from the group consisting of glycol, diglycol and glycerin.

6. A process according to claim 3 wherein said additionally polyvalent alcohol is a member selected from the group consisting of glycol, diglycol and glycerin.

7. A process according to claim 1 wherein there is additionally incorporated into said composition at least one member selected from the group consisting of calcium oxide, magnesium oxide, fillers, lubricants and pigments.

8. A process according to claim 1 wherein said polyvinyl alcohol is incorporated into said novolak prior to the removal of the water therefrom by distillation.

9. A rapidly hardening molding composition comprising the product produced by the process of claim 1.

References Cited

UNITED STATES PATENTS

| 2,462,252 | 2/1949 | Booty | 260—844 |
| 2,474,292 | 6/1949 | Weidner et al. | 260—844 |
| 2,534,607 | 12/1950 | Laher et al. | 260—33.4 |
| 2,890,948 | 6/1959 | Fantl et al. | 260—844 |

MORRIS LIEBMAN, *Primary Examiner.*

L. T. JACOBS, *Assistant Examiner.*

U.S. Cl. X.R.

260—844